United States Patent
Holomon et al.

(10) Patent No.: US 12,522,121 B1
(45) Date of Patent: Jan. 13, 2026

(54) CRAWLER CARRIER FOR DISTRIBUTING MATERIALS

(71) Applicant: Enviro Services Rental, L.L.C., Farmerville, LA (US)

(72) Inventors: Chris Holomon, Farmerville, LA (US); Trey Towns, Farmerville, LA (US); Jason Holmes, Farmerville, LA (US); Josh Black, Farmerville, LA (US)

(73) Assignee: Enviro Services Rental, L.L.C., Farmerville, LA (US)

( * ) Notice: Subject to any disclaimer, the term of this patent is extended or adjusted under 35 U.S.C. 154(b) by 0 days.

(21) Appl. No.: 18/966,084

(22) Filed: Dec. 2, 2024

Related U.S. Application Data

(60) Provisional application No. 63/605,305, filed on Dec. 1, 2023.

(51) Int. Cl.
*B60P 1/02* (2006.01)
*B62D 55/10* (2006.01)

(52) U.S. Cl.
CPC .............. *B60P 1/02* (2013.01); *B62D 55/10* (2013.01)

(58) Field of Classification Search
CPC ................................. B60P 1/02; B62D 55/10
See application file for complete search history.

(56) References Cited

U.S. PATENT DOCUMENTS

| | | |
|---|---|---|
| 1,567,473 A | 12/1925 | Starr |
| 2,279,340 A | 4/1942 | Postlewaite |
| 2,408,862 A | 10/1946 | Lisota |
| 2,680,529 A | 6/1954 | Narvestad |
| 2,710,104 A | 6/1955 | Putnam |
| 2,772,794 A | 12/1956 | Cramer et al. |
| 2,776,762 A | 1/1957 | Schmidgall |
| 3,042,231 A | 7/1962 | Cyphert |
| 3,216,520 A | 11/1965 | Blonsky |
| 3,219,206 A | 11/1965 | Cocker, III |
| 3,323,838 A | 6/1967 | Trucco |
| 3,419,159 A | 12/1968 | Schaller et al. |
| 3,486,609 A | 12/1969 | Rogers |
| 3,667,620 A | 6/1972 | Steiro |
| 3,858,731 A | 1/1975 | Briggs |
| 3,964,791 A | 6/1976 | Griffis |
| 4,289,443 A | 9/1981 | Jacob |
| 5,358,371 A | 10/1994 | Neddo |

(Continued)

FOREIGN PATENT DOCUMENTS

| | | |
|---|---|---|
| AU | 200245907 A | 12/2002 |
| AU | 785409 B2 | 5/2007 |

(Continued)

OTHER PUBLICATIONS

Crawler Carriers by Terramac.
Superior Manufacturing.

*Primary Examiner* — Kyle J Kingsland
(74) *Attorney, Agent, or Firm* — Joseph S. Bird, III; C. Brandon Browning

(57) ABSTRACT

The present invention is a self-propelled crawler carrier for distributing materials in a dispersed worksite outdoors or indoors. A base vehicle has an application of a first bed and a second bed lift which allows workers to remove one or more pieces of material which were loaded in bulk on the first bed. The invention has low ground/floor pressure PSI in several embodiments because of rubber tracks.

11 Claims, 16 Drawing Sheets

(56) References Cited

U.S. PATENT DOCUMENTS

| | | | | |
|---|---|---|---|---|
| 5,607,277 | A * | 3/1997 | Zopf | ............... B65F 3/041 |
| | | | | 414/408 |
| 7,111,907 | B2 * | 9/2006 | Boon | ............... B60P 1/26 |
| | | | | 298/18 |
| 8,485,607 | B2 * | 7/2013 | Elliott | ............... B65F 3/26 |
| | | | | 298/1 A |
| 8,500,383 | B2 | 8/2013 | Schmidgall | |
| 9,957,675 | B2 | 5/2018 | Marsolek et al. | |
| 10,720,541 | B2 | 7/2020 | Gerwing et al. | |
| 10,752,146 | B2 | 8/2020 | Renger et al. | |
| 11,485,433 | B2 | 11/2022 | Sauvageau et al. | |
| 11,491,904 | B1 | 11/2022 | Meyer et al. | |
| 11,500,379 | B2 | 11/2022 | Posselius et al. | |
| 11,822,342 | B1 * | 11/2023 | Ready-Campbell | ............... |
| | | | | G05D 1/0274 |
| 2012/0034056 | A1 | 2/2012 | Schmidgall | |
| 2016/0264191 | A1 * | 9/2016 | Wassell | ............... B60P 1/02 |
| 2020/0406804 | A1 * | 12/2020 | Jarvis | ............... B60P 1/60 |
| 2021/0023977 | A1 | 1/2021 | Jester | |
| 2021/0037691 | A1 | 2/2021 | Horsch | |
| 2021/0245648 | A1 | 8/2021 | Huang | |
| 2022/0379792 | A1 | 12/2022 | Wehner et al. | |
| 2022/0411245 | A1 | 12/2022 | Bailey | |
| 2023/0124346 | A1 * | 4/2023 | Agnew | ............... B62D 55/10 |
| | | | | 180/9.21 |
| 2023/0257041 | A1 | 8/2023 | Webb | |

FOREIGN PATENT DOCUMENTS

| | | |
|---|---|---|
| CN | 217598721 U | 10/2022 |
| WO | 2010082842 A1 | 7/2010 |

* cited by examiner

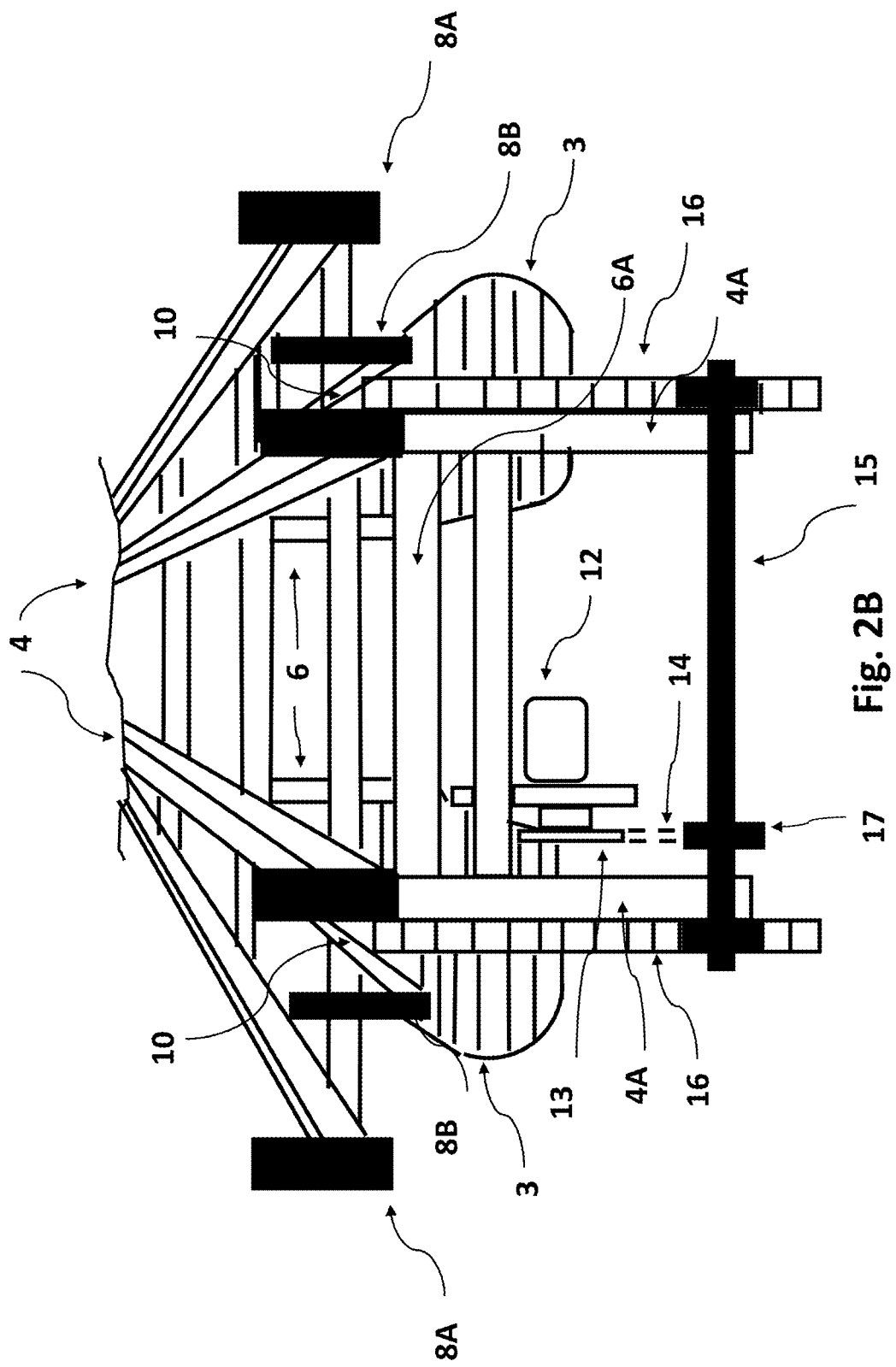

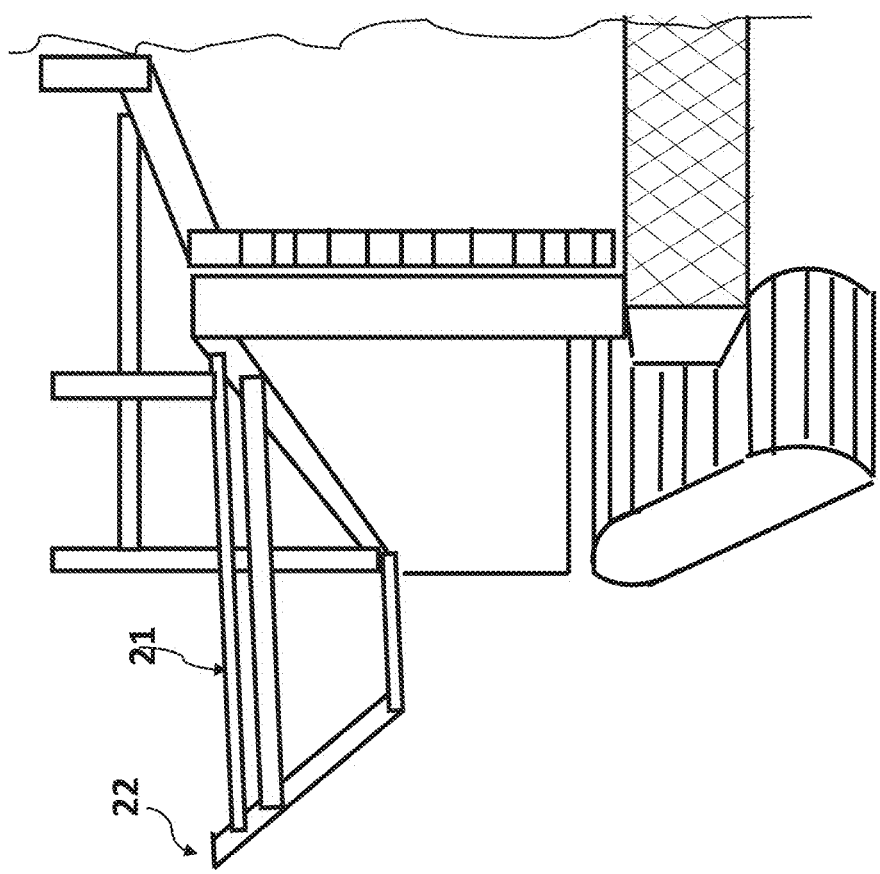

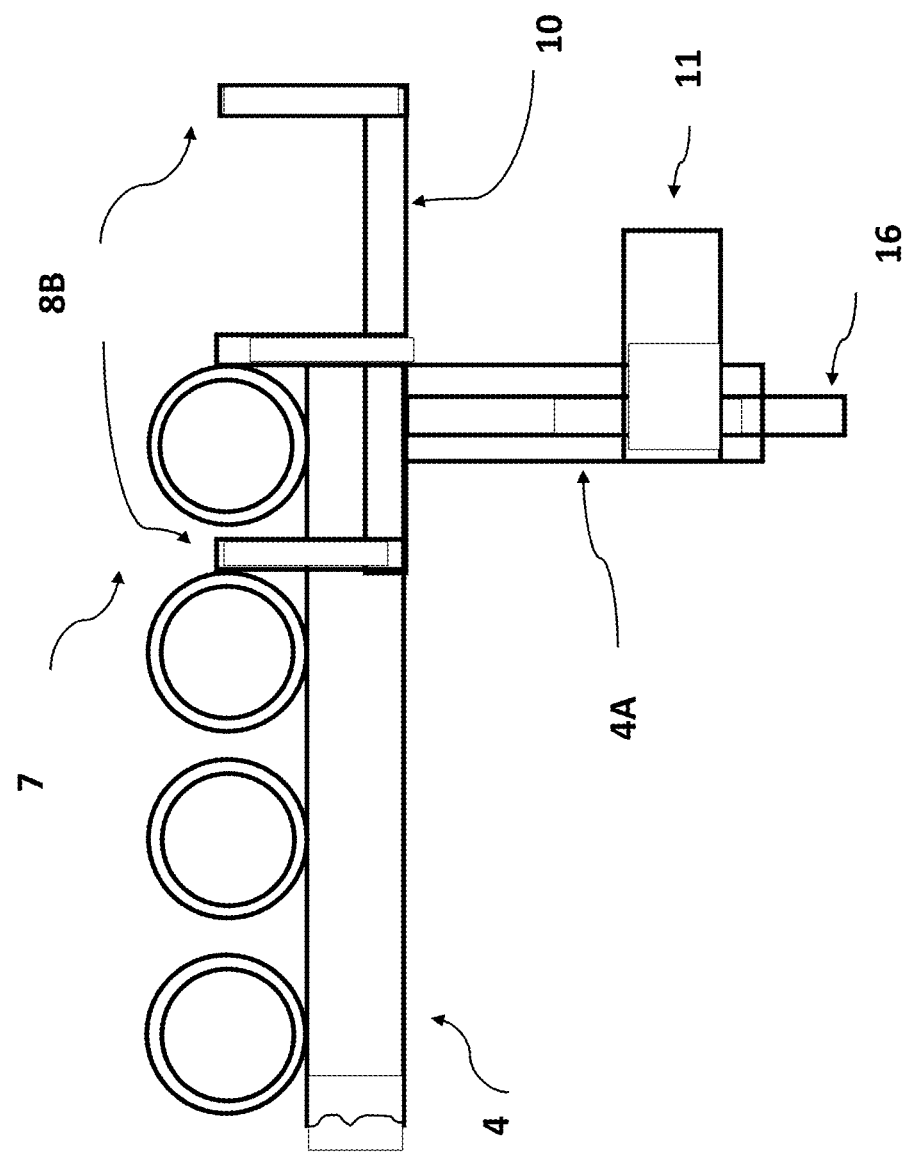

11

11

CRAWLER CARRIER FOR DISTRIBUTING MATERIALS

PRIORITY CLAIM

This application claims priority to, and the full benefit of, U.S. provisional patent application No. 63/605,305 filed on Dec. 1, 2023, and also incorporates the same.

BACKGROUND

On dispersed work sites materials must be distributed widely so that workers can install them. These work sites may be outdoors or indoors. Some outdoor sites are environmentally sensitive, and some if damaged on the ground surface would require extensive reconditioning. For a dispersed site and for materials which are too heavy for workers to carry comfortably, machinery is needed, but its impact on the ground surface must be slight. For dispersed indoor sites, machinery is also needed for distribution of materials in a manner which will not damage the concrete flooring. There is thus a need for a machine to enable distribution of heavy materials with minimal impact on the ground surface or on the concrete flooring.

BRIEF DESCRIPTION OF THE FIGURES

FIG. 2B is a diagram of the rear of an embodiment of the invention without wings to the front of the first bed.

FIG. 2F is an image of the left rear of an embodiment of the invention with an extended wing.

FIGS. 3A-3E show steps for segregation of a piece of material on the first bed to installation.

ASPECTS OF THE INVENTION

Figure 1:
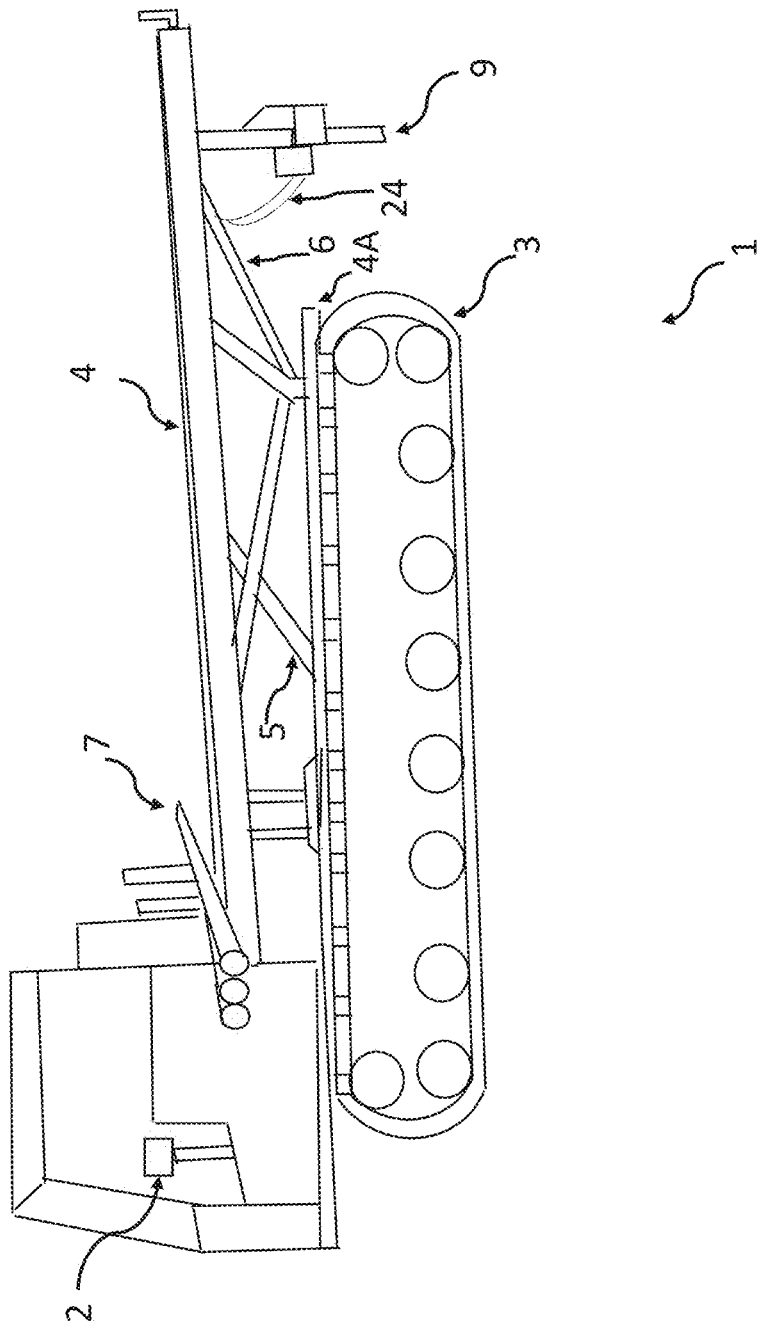
FIG. 1 is an image of one side of the invention with the first bed tilted slightly forward.

The invention herein is a self-propelled crawler carrier for distributing materials in a dispersed worksite comprising a base vehicle comprising a power plant configured to propel the crawler carrier by tracks, a frame, and a hydraulic system, also comprising a first bed and a second bed lift and at least one set of controls for the hydraulic system configured to control distribution of the materials, said power plant also configured to provide power to the hydraulic system for operating the first bed and the second bed lift, the first bed being configured for holding the materials and being configured to enable the first bed to tilt or to move vertically, the second bed lift also configured to move vertically and to segregate a portion of the materials into a position suitable for placement in the dispersed worksite.

The self-propelled crawler carrier herein further comprises wings to extend and retract the first bed, and in other embodiments the second bed lift further comprises a set of second wings configured to extend and retract the second bed lift.

The tracks of many embodiments of the base vehicle are composed of a flexible material selected from the group consisting of rubber or other polymer but in other embodiments in which the ground surface is durable (e.g., rocky) the tracks are composed of metal.

The self-propelled crawler carrier may further comprise video cameras to allow the base vehicle operator to survey and monitor movement and position in the dispersed worksite.

The second bed lift may be configured to be operated by a chain assembly connected to a hydraulic motor in the hydraulic system and the chain assembly is connected to a rack and pinion assembly configured to move the second bed lift vertically.

The at least one set of controls comprises in some embodiments comprises only a set of toggle controls. In other embodiments, the at least one set of controls comprise toggle controls and remote controls, in one embodiment the movements of the first and second bed, including the wings, are most efficient controlled by workers on the ground with a set of remote controls connected wirelessly to a wireless receiver configured to control the first bed and/or the second bed lift by workers behind the self-propelled crawler carrier.

The upper surface of one or both of the first bed and the second bed lift may be composed of a mesh in different embodiments, not just the metal bars shown in the figures.

The present invention has minimal impact on the environment, terrain, and soil of an outdoor work site, and on an indoor site's concrete flooring. This causes less erosion with to prevent or minimize disturbance of the soil surface or cause less cracking damage to a concrete floor. Low ground pressure helps protect the environment and reduces the restoration cost for the surface soil or repair of cracks on a concrete floor. For example, a 6000 lb. car has approximately 15 lbs. per square inch of ground pressure, while in one embodiment the present invention is a 42,000 lb. machine with just 3.8 lbs PSI of ground pressure unloaded and 6.4 lbs PSI while fully loaded. Rubber tracks reduce noise pollution over steel tracks and tires and thus provides less vibrations with a smoother footprint.

The present invention comprises a type of base vehicle already widely in use in work site settings. By way of example only, one of these base vehicles is the RT9 Rubber Track Carrier manufactured by Terramac of Sugar Grove, Illinois. The RT9 has a 408 cubic inch diesel engine producing 225 HP at 2200 RPMs. It has a hydrostatic transmission. The hydraulic system produces a drive pump max flow (×2) at 43 gpm/side and drive pump max pressure of 5,500 PSI. The tandem gear pump max flow for the front section (AUX output) is 25 gpm @3000 PSI and the rear section (HST drive) is 22 gpm @550 PSI, with an optional pump drive of 25 gpm @2500 PSI. Base vehicles of other manufacturers having similar capabilities are also included in this invention. The base vehicle with the above capabilities is well-suited for installation of pipes in a highly distributed network of solar panels. The present invention can also comprise smaller and larger versions of the base vehicle for applications with different needs.

The invention operates efficiently, reliably, and cost effectively carrying large loads of material directly to each installation location. Installation can be either incorporation into a building or apparatus, or can be delivery or placement of inventory. Using the invention's hydrostatic transmission, speed and precise stopping capability ensures each item of material is positioned properly with minimal human labor. In one embodiment, the base vehicle's ability to haul nine tons of product keeps reloading to a minimum, while also causing less down-time thus improving time management. In one embodiment with a set of remote controls, the rear ground operator controls where the materials are being installed which allows employees to accurately place each piece of material in the correct position. This base vehicle is a rubber track carrier, which allows this machine to travel in the worst or best conditions. This crawler carrier can navigate mud, hills, sand, and rough and harsh terrain. The rubber tracks allow it to cross roads without damaging the road or equipment. In one embodiment with 21" of ground clearance and 225 hp, the invention travels over areas without building costly roads to access difficult areas. The relatively soft rubber tracks minimize cracking on concrete flooring.

FIG. 1 is an image of the side one embodiment of the invention 1. An operator sits in a cockpit 2 in which are located controls (not pictured) for the self-propulsion of the power plant 18 (not pictured) which is either an internal combustion engine or an electric motor. The power plant 18 propels the vehicle by means of bilateral tracks 3 of the base vehicle. The first bed 4 is tilted or moved vertically by the action of the first bed lifts 5 and is held by the first bed supports 6, and when tilted it holds materials 7 stationary and in forward position against the front of the first bed. At the rear of the first bed, the second bed lift 9 is affixed securely to a lower extension 4A of the first bed. In FIG. 1 the second bed lift is positioned so that the top arms 10 of the second bed lift are even with the top surface of the first bed. The rear bars for the first bed 8A and second bed lift 8B are shown here. In some embodiments an upper surface of one or both of the first bed and the second bed lift are composed of an expanded wire mesh.

Figure 2A:
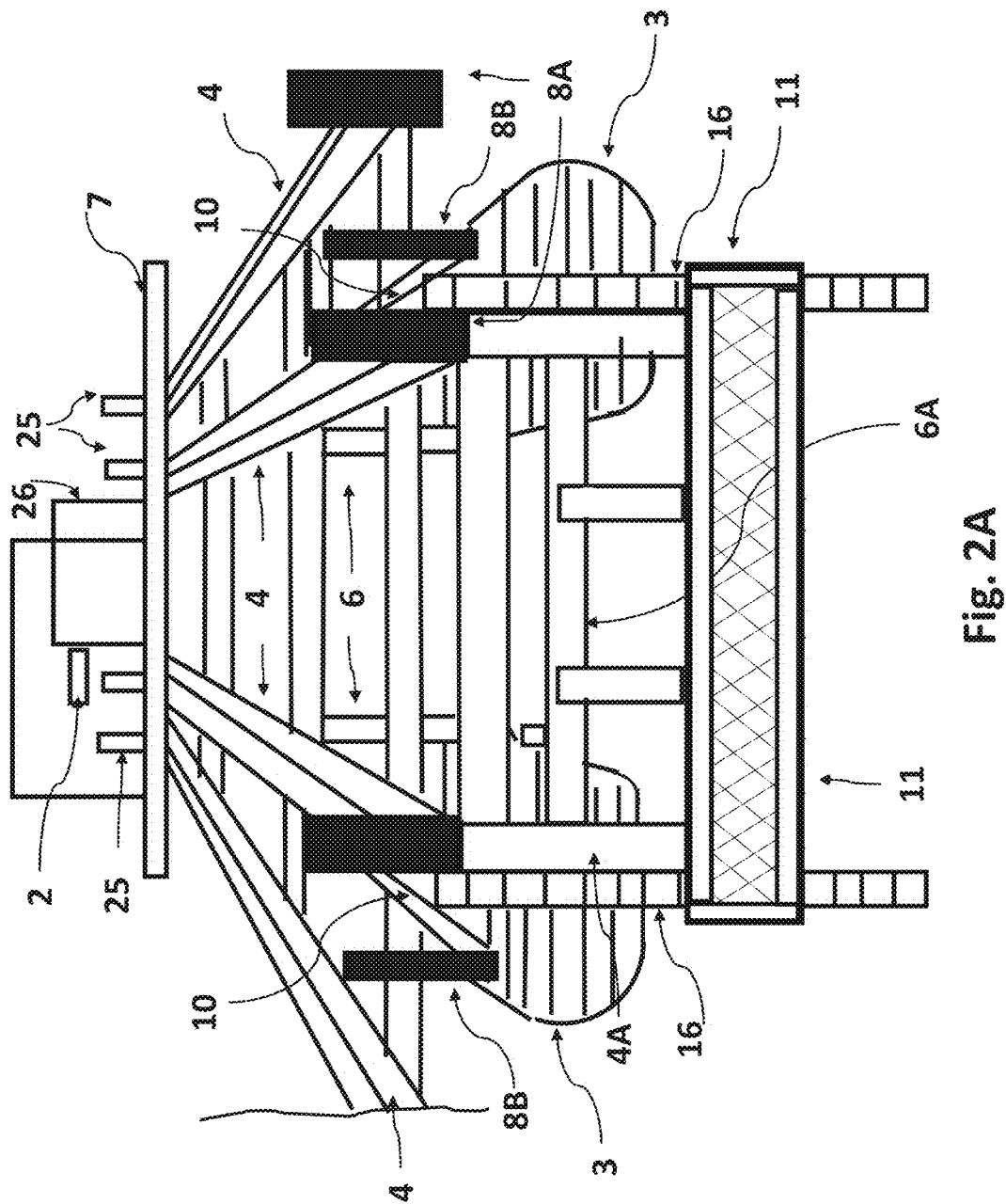
FIG. 2A is an image of the rear of an embodiment of the invention without wings.

FIG. 2A is an image of the rear of one embodiment of the invention with the safety guard 11 covering the chain 14 and rod 15 of the mechanism driving the second bed lift 9 whose top arms 10 are shown slightly below the level of the first bed 4. One piece of material 7, here a pipe, is shown. The rear bars 8A of the first bed are shown, with the exception of the one on the far left. Because the first bed is symmetrical, the missing rear bar on the far left would be in the same position as the one on the far right. The frame 6A (only the rear part is shown here) of the base vehicle supports the first bed by means of first bed supports 6. Front material stops 25 are at the front of the first bed and they prevent contact with the power plant cover 26.

Figure 2C:
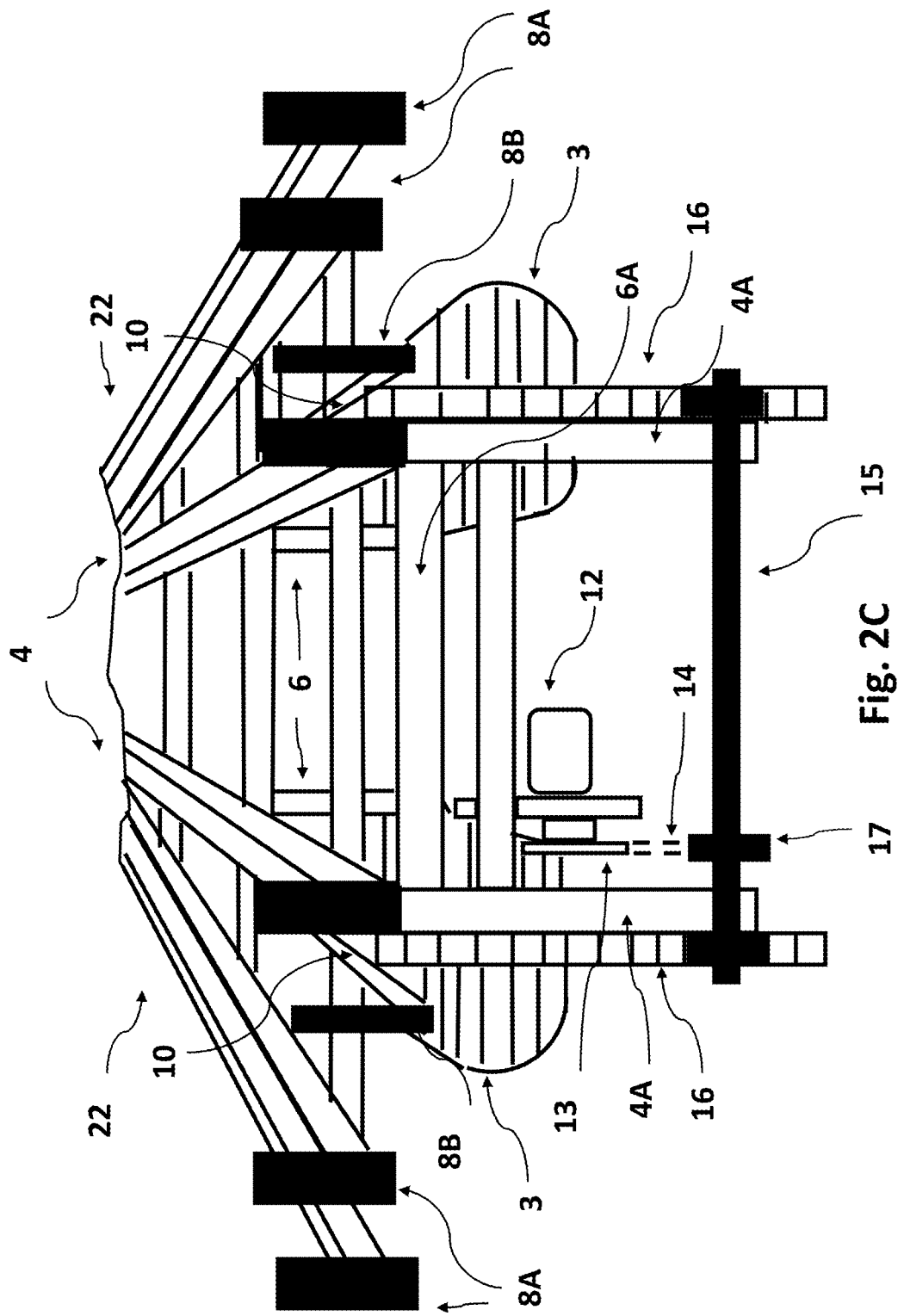
FIG. 2C is a diagram of the rear of an embodiment of the invention with retracted wings to the front of the first bed.
Figure 2D:
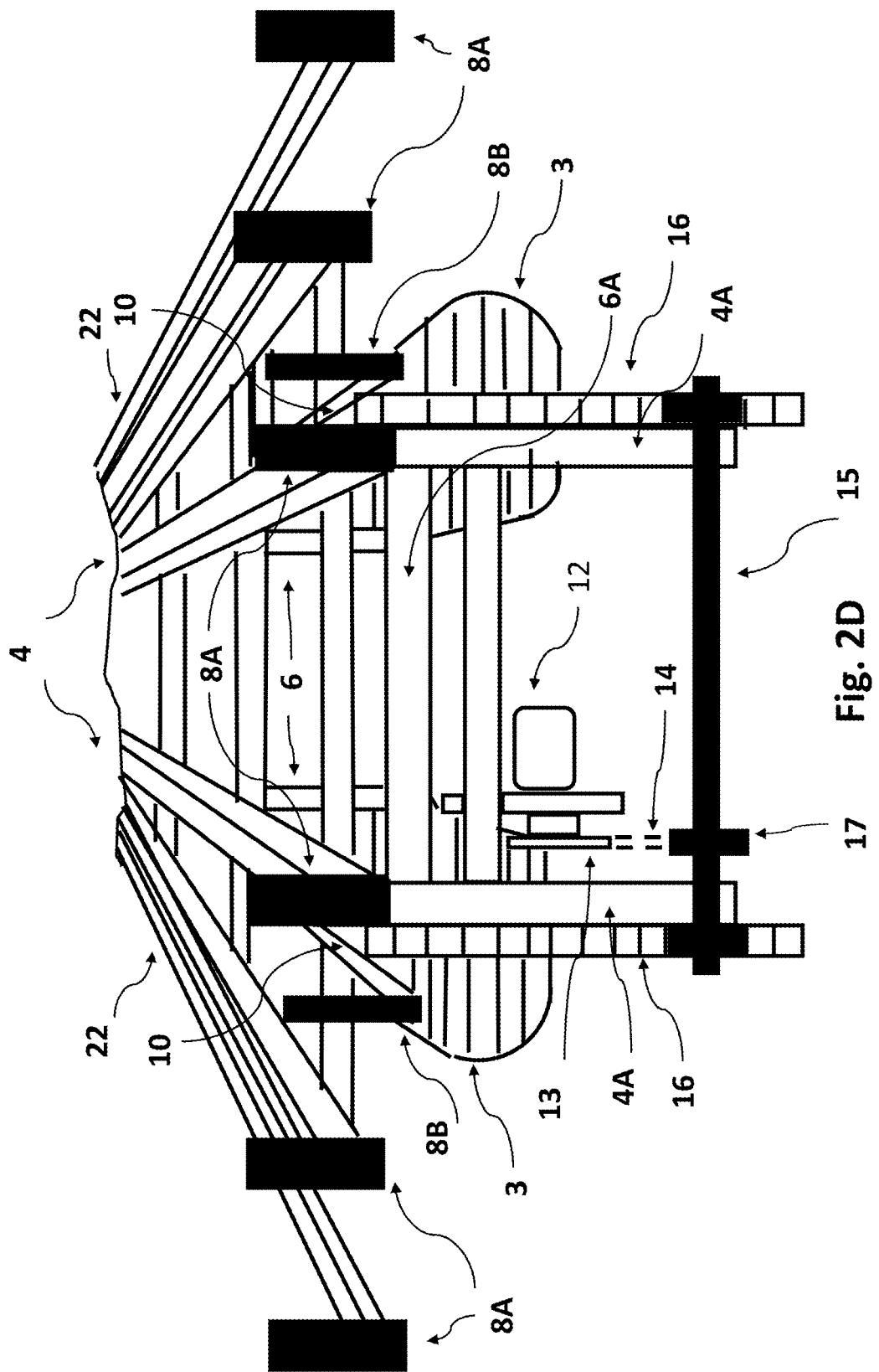
FIG. 2D is a diagram of the rear of an embodiment of the invention with extended wings to the front of the first bed.

FIG. 2B is a diagram of the rear of the first bed and the second bed lift without the safety guard, and FIGS. 2B-2D omit the portion of the invention beyond the first bed. The second bed lift is affixed to a lower extension 4A of the first bed. A hydraulic motor 12 drives a gear 13 and a chain 14 to drive a rod 15 connected to a rack and pinion 16 system to raise or lower the second bed lift. The second bed lift in this embodiment is activated with a remote control. The operator can tilt the first bed so that materials move down to and rest against the rear material stop for the first bed.

Figure 2E:
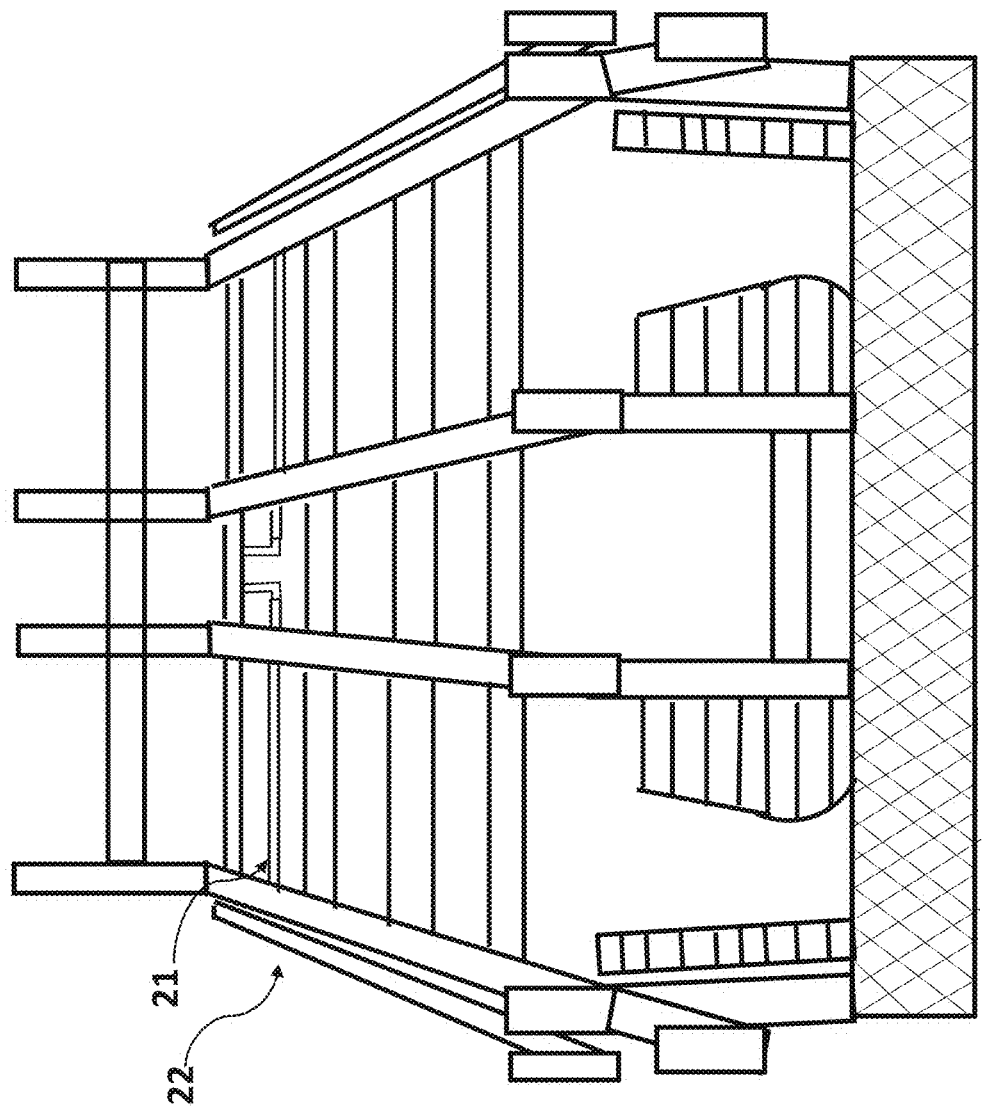
FIG. 2E is an image of the rear of an embodiment of the invention with retracted wings.
Figure 2G:
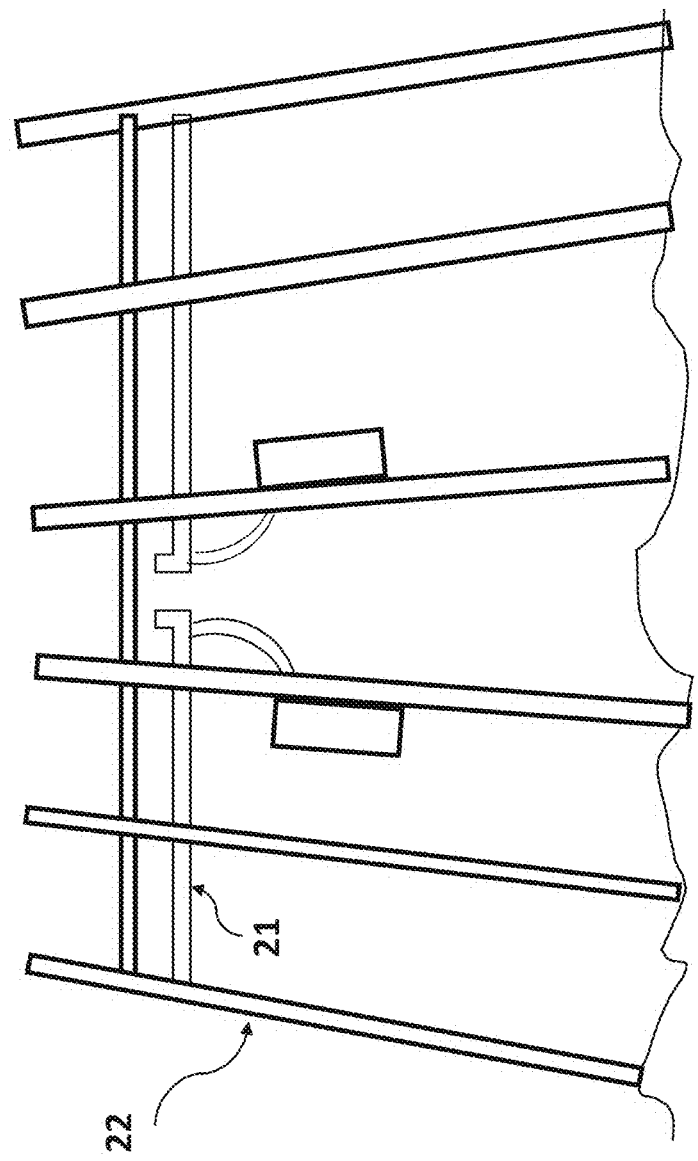
FIG. 2G is an image taken from the front of the first be in an embodiment of the invention with extended wings.
Figure 3A:
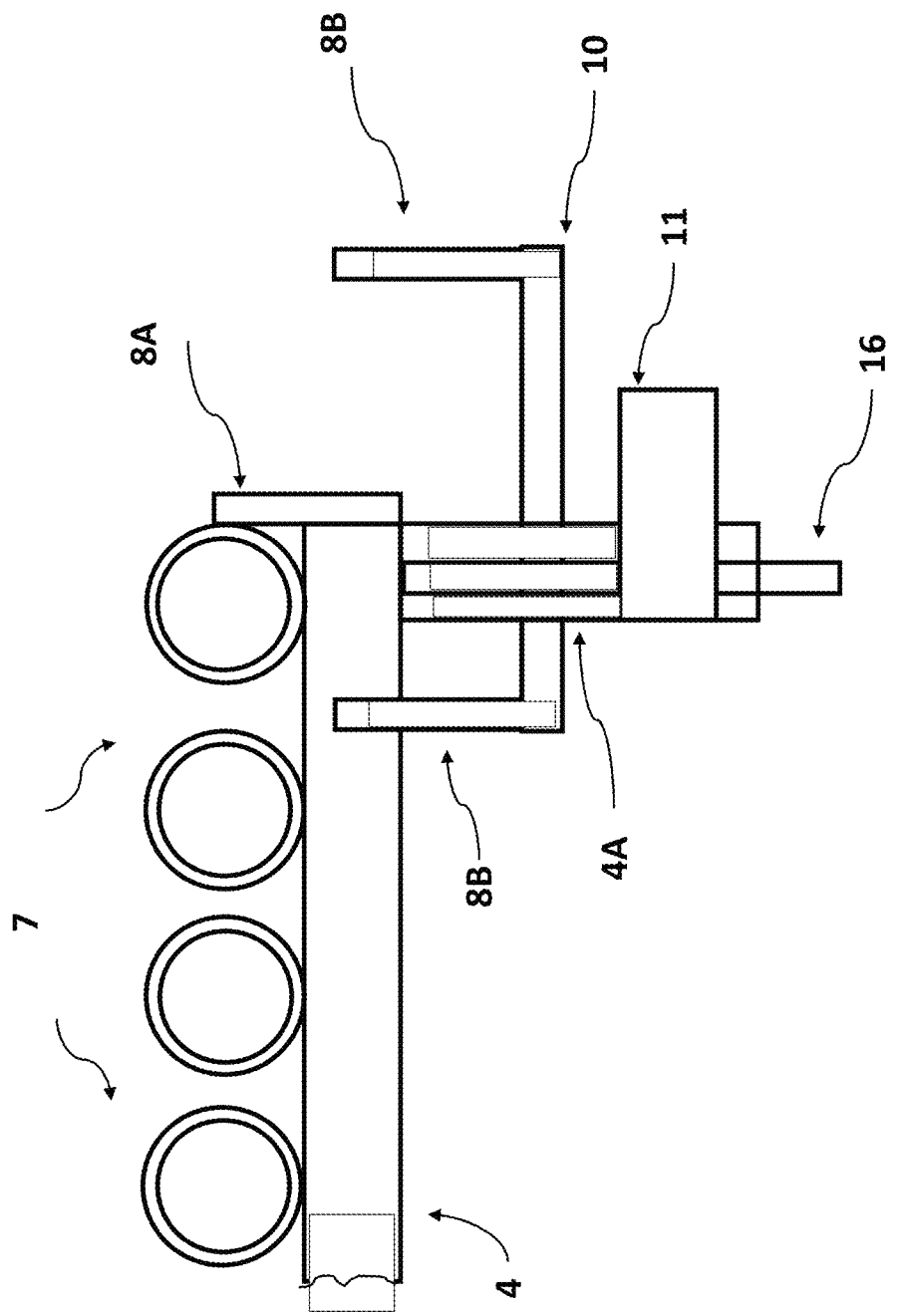
Figure 3C:
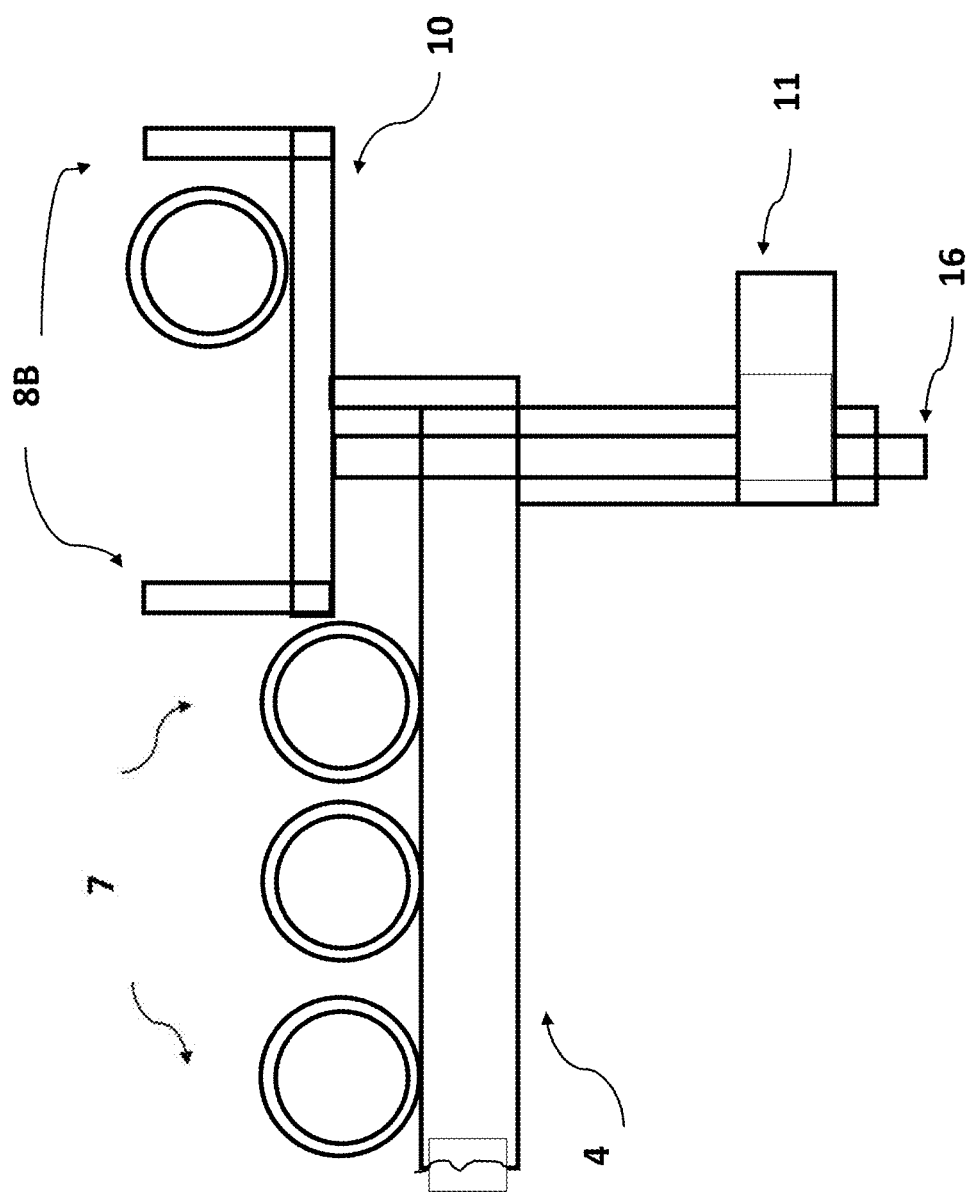
Figure 3D:
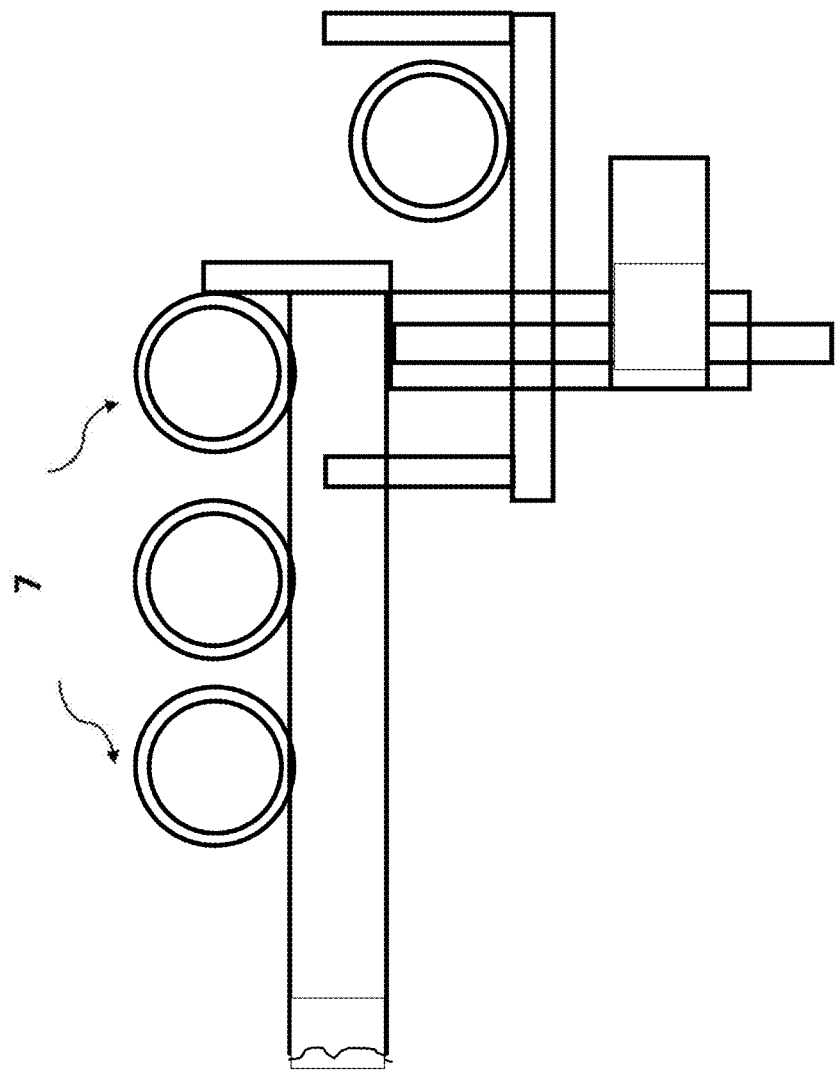
Figure 3E:
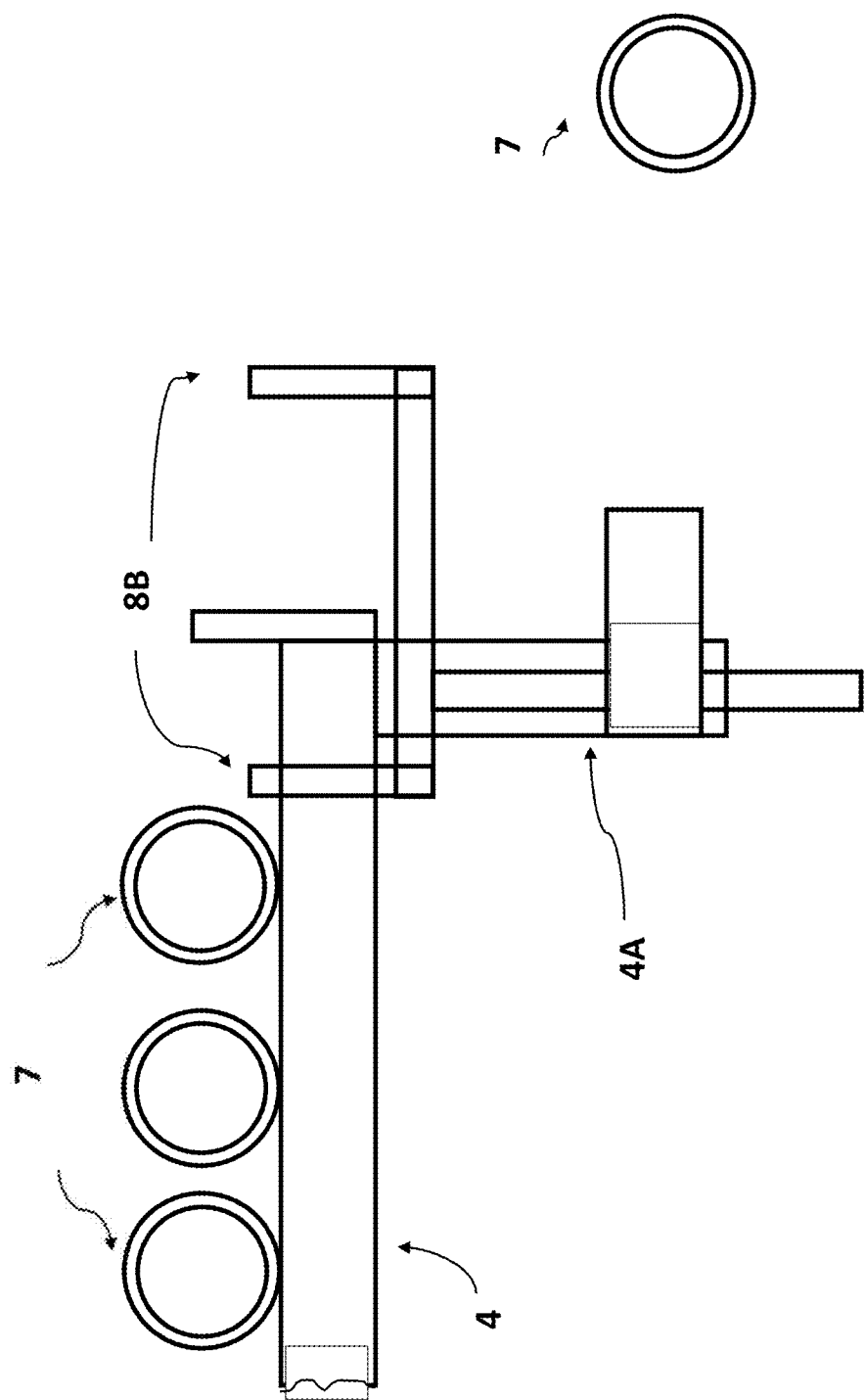

In one embodiment the first bed is equipped with the capability to be widened with wings 22 which form an enlargement of the first bed. FIG. 2C is a rear diagram identical in this embodiment to that of FIG. 2B, except that the embodiment in FIG. 2C also comprises wings 22 on both sides which allow the width of the first bed to be extended for wider materials, and then retracted when not needed. In FIG. 2C the wings are retracted, but FIG. 2D shows them extended. FIG. 2E is an image of the first bed from the rear with wings 22 and the wings are retracted. The hydraulic cylinders 21 for the wings are visible at the front of the first bed. FIG. 2F is an image of the left side of the first bed with the wing 22 extended, and the right side is symmetrical. FIG. 2G is an image from the front of the first bed with both wings 22 extended. The hydraulic cylinders 21 for the wings are visible at the rear of the first bed.

The remote control can raise the second bed lift so that a rear bar 8B for the second bed lift segregates a piece of material 7 resting against the rear bars 8A for the first bed and the top arms 10 of the second bed lift 9 are level with the first bed. Then the operator raises the second bed lift now holding a piece of material until it rises above the rear bars 8A of the first bed so that the material can clear the rear bars for the first bed, and then the second bed lift can be lowered to position. Then the second bed lift can deposit the piece of material in a position where it will be affixed, or workers can lift the material to place it in position. The movement of the second bed lift in relation to the first bed is shown in steps in FIGS. 3A-3E. In 3A, all of the materials are on the first bed and below it is the second bed lift. 3B shows the second bed lift elevated with the stops segregating a piece of material from the others on the first bed. In other embodiments, more than one piece of material can be segregated by the second bed. In 3C, the second bed lift has been lifted higher so that it clears the rear bars of the first bed and the piece of material, here round, can roll to the back of the second bed. In 3D, the second bed lift has been lowered with a piece of material and, in 3E, the piece of material has been removed from the second bed lift and placed into a position on the worksite.

Figure 4:
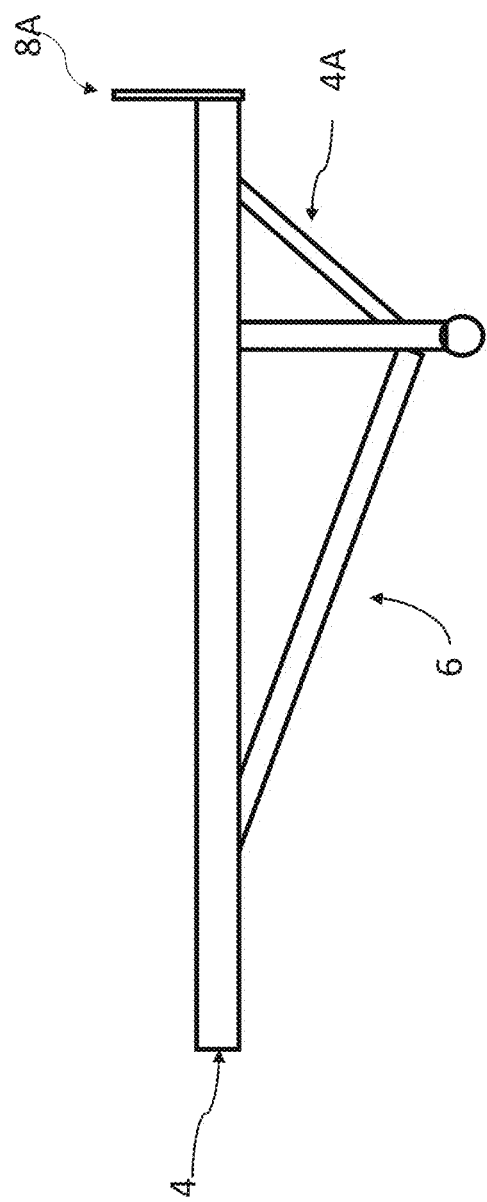
FIG. 4 is a side view of the first bed.

FIG. 4 is a side view of the first bed and its supports 6 and the lower extension 4A.

Figures 5A, 5B:
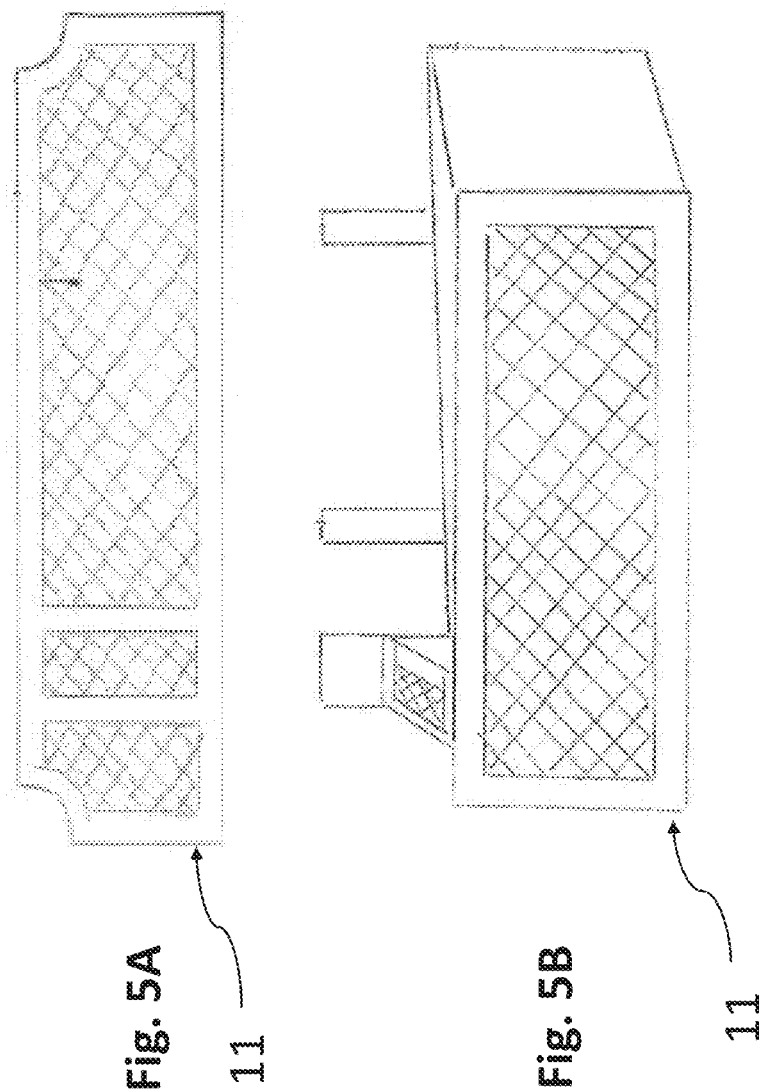
FIGS. 5A and 5B are diagrams of the safety guard on the second bed lift.

FIGS. 5A (top) and 5B (side perspective) are two views of an embodiment of a safety guard 11 on the mechanism driving the second bed lift to prevent injury to the workers.

Figure 6:
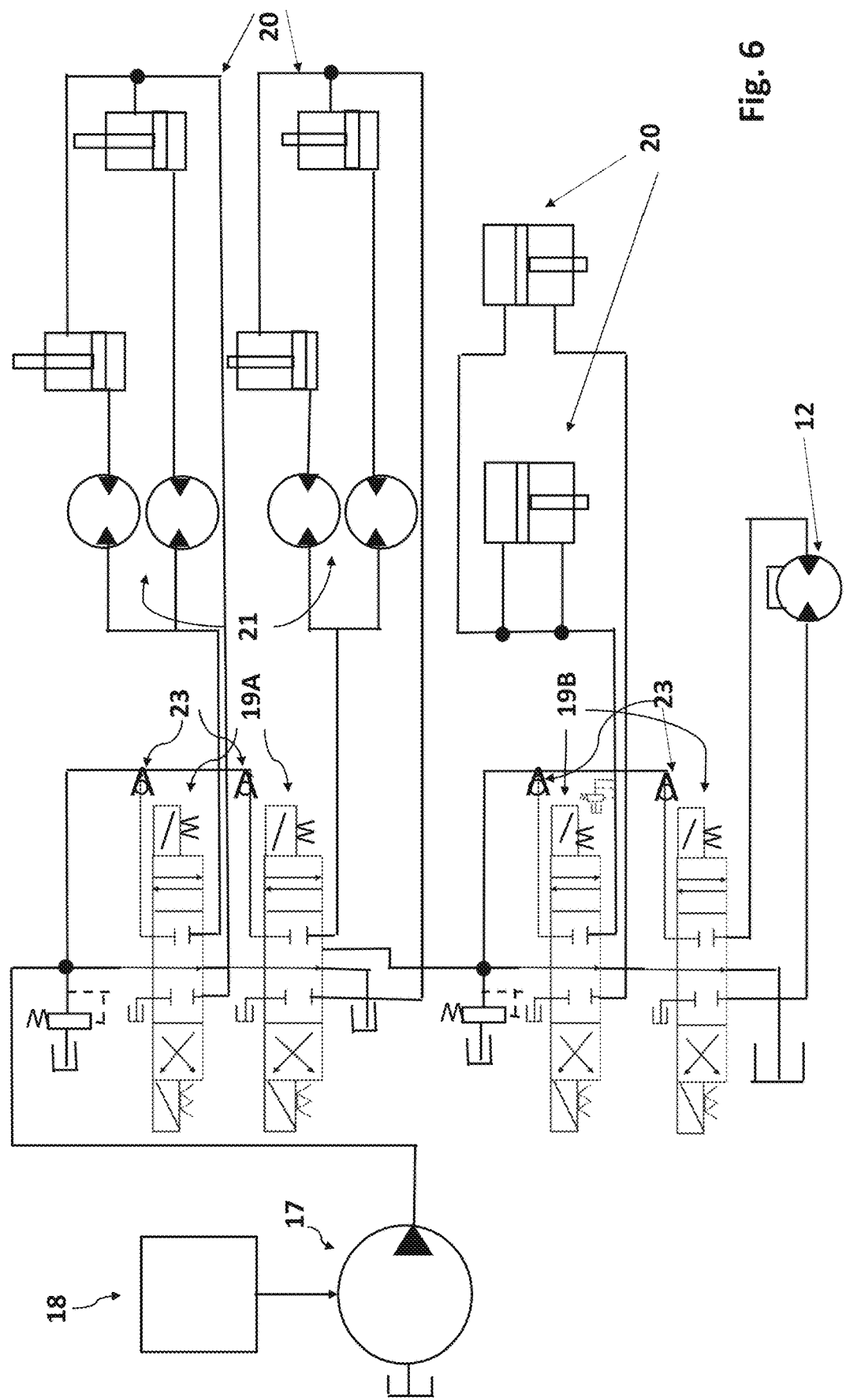
FIG. 6 is a schematic of the hydraulic system of one embodiment of the invention.

A schematic of one embodiment of the hydraulic system for the first bed and second bed lift is shown in FIG. 6. It is only one example of a suitable hydraulic system which is incorporated into the invention. In one embodiment, the pump 17 is a fixed displacement pump for use in an open loop system. FIG. 6 does not show aspects of the hydraulic system provided as part of the base vehicle referred to and incorporated herein. Images in FIGS. 2E-2G are labeled with some of the hydraulic lines 24 as visible, but the mapping of hydraulic lines is variable in the invention.

The hydraulic system comprises a pump 17 and receives its power from a power plant 18 which can be an internal combustion motor or an electrical motor. The power plant drives the pump.

In one embodiment the pump is connected through four 4-way directional control valves 19A, 19B normally open (through center). In FIG. 6 toggle control valves 19A are for extending and retracting the wings 22 and remote control valves 19B are for the movement of the first bed and second bed lift. In one embodiment the valves 19A, 19B comprise 12 volt DC solenoid switches. In one embodiment, the hydraulic power for expanding or retracting the wings to widen or narrow the first bed is provided through flow dividers 21 which insure the wings move together equally. In another embodiment, the hydraulic power for driving lower the first bed and for driving cylinders for the extenders for the first bed, that is, to extending and retracting the wings.

In one embodiment a set of toggle controls operates the directional valves for the all of the hydraulic system for distributing the materials and, in another, only for the first bed and the wings of the first bed.

In one embodiment a set of remote controls operates the second bed lift which is driven by a hydraulic motor whose gear drives a chain for rotating a drive shaft for raising or lowering the second bed lift by means of a rack and pinion assembly.

An embodiment of the invention without an enclosed cockpit allows the greatest visibility but a full glass enclosure can allow the machine operator and ground operators to keep direct line of site with each other. This limits the chances of putting workers in a hazardous or dangerous position and eliminates damage to surrounding objects or personnel. In one embodiment, one or more rear cameras (not depicted) positioned in one or more of several locations permits the vehicle operator in the cockpit to see ground employees while staying focused on forward movement. Safe communication by two-way headset radio, emergency horn, rear camera, sliding door window, and large mirrors.

The first bed may be loaded with material by a forklift or some type of front-end loader. The load will consist of several pieces of material laying across the bed (left to right) to be transported to the desired location. Each piece will be separated one or more at a time by the second bed lift controlled by the ground operator using a remote-control. While the crawler carrier is moving forward the ground operator will use the remote-control to lift and lower one tube off the bed with the second bed lift. Two employees, one on each end of the tube, are able to secure the material while the ground operator lowers the second bed lift. Once the crawler is at the proper location and the desired height is established, the workers will manually lift the tube off the second bed lift and place it into the installation location. The ground operator will notify the vehicle operator to continue moving to the next location and use the remote control to raise the lifting arms to load the next individual tube. This process will continue until all materials have been installed or the first bed is empty and needs to be reloaded.

In some embodiments the width of the second bed lift varies. A wider second bed lift keeps a piece of material more stable while a narrower dimension allows the operators to tilt the piece of material more easily.

We claim:

1. A self-propelled crawler carrier for distributing materials in a dispersed worksite comprising a base vehicle comprising a power plant configured to propel the crawler carrier by tracks, a frame, and a hydraulic system, also comprising a first bed and a second bed lift and at least one set of controls for the hydraulic system configured to control distribution of the materials, said power plant also configured to provide power to the hydraulic system for operating the first bed and the second bed lift, the first bed being configured for holding the materials and being configured to enable the first bed to tilt or to move vertically, the second bed lift also configured to move vertically and to segregate and move a portion of the materials rearwardly from the first bed into a position on the second bed lift suitable for placement in the dispersed worksite, the portion of the materials segregated and moved rearwardly from the first bed to the second bed lift being specified by relative positions of the first bed and the second bed lift.

2. The self-propelled crawler carrier as in claim 1 wherein the first bed further comprises wings to extend and retract the first bed.

3. The self-propelled crawler carrier as in claim 1 wherein the second bed lift further comprises a set of second wings configured to extend and retract the second bed lift.

4. The self-propelled crawler carrier as in claim 1 wherein the tracks are composed of a flexible material selected from the group consisting of rubber or other polymer.

5. The self-propelled crawler carrier as in claim 1 wherein the tracks are composed of metal.

6. The self-propelled crawler carrier as in claim 1 further comprising video cameras to survey and monitor movement and position in the dispersed worksite.

7. The self-propelled crawler carrier as in claim 1 wherein the second bed lift is configured to be operated by a chain assembly connected to a hydraulic motor in the hydraulic system.

8. The self-propelled crawler carrier as in claim 7 wherein the chain assembly is connected to a rack and pinion assembly configured to move the second bed lift vertically.

9. The self-propelled crawler carrier as in claim 1 wherein the at least one set of controls comprises a set of toggle controls.

10. The self-propelled crawler carrier as in claim 1 wherein the at least one set of controls comprises a set of remote controls wirelessly connected to a wireless receiver configured to control first bed and/or the second bed lift by workers behind the self-propelled crawler carrier.

11. The self-propelled crawler carrier as in claim 1 wherein an upper surface of one or both of the first bed and the second bed lift is composed of a mesh.

* * * * *